E. KASELOWSKY.
Car-Wheel.
No. 200,400.  Patented Feb. 19, 1878.
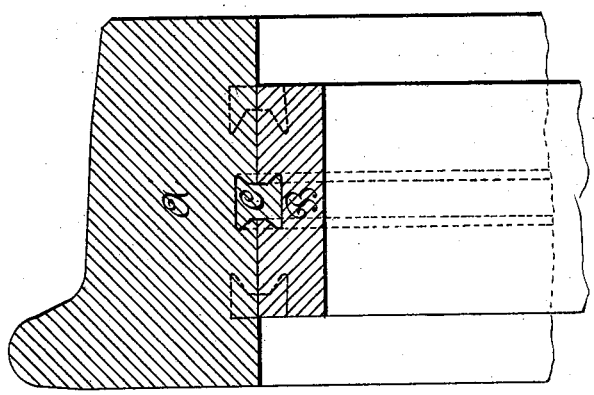
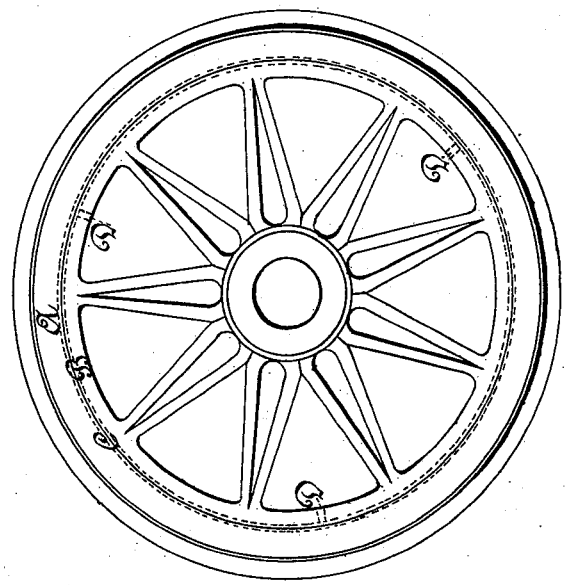
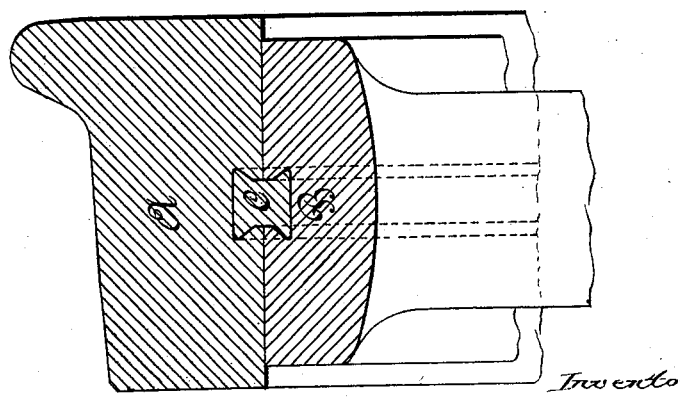

UNITED STATES PATENT OFFICE.

EMIL KASELOWSKY, OF BERLIN, PRUSSIA.

IMPROVEMENT IN CAR-WHEELS.

Specification forming part of Letters Patent No. 200,400, dated February 19, 1878; application filed June 21, 1877.

*To all whom it may concern:*

Be it known that I, EMIL KASELOWSKY, of the city of Berlin, Prussia, have invented an improved method of fastening the tires on railroad-wheels by means of a metal ring cast between tire and crown, of which the following is a specification:

The numerous railway accidents arising from the breaking of wheel-tires have made it desirable to fasten the tires in such a way that they still cling to the wheel whenever by any influence they become imperfect, and that single pieces are not flung away, whereby the most serious accidents are occasioned.

Of the many constructions that have generally been adopted, the Mansell ring is perhaps the best, but on account of the use of bolts it does not obviate all danger, as bolts are liable to fly off and loosen the ring; besides, such a wheel is very expensive, and the Mansell ring is, with difficulty, applied to existing wheels.

My improved manner of fastening, here described and represented, obviates all bolts, keys, or screws, renders a loosening of the tire quite impossible, is cheaper, and may be applied with little expense to all existing wheels.

In the accompanying drawings, forming part of this specification, Figure I shows a section of the fastening for strong locomotive-wheels. Fig. II shows another form of the fastening-rings. Fig. III is a side elevation of a wheel.

A is the tire, B the crown of the wheel. C is a metal ring of dovetailed or any other convenient section, catching by reason of its form into the tire, as well as into the wheel-crown. The dimensions of this ring are chosen in such a manner that the metal, by cooling, shrinks in the direction of the radius, thereby drawing tire and crown tightly together.

After having turned a groove into the tire and into the crown, of a form corresponding to the intended form of the metal ring, and having driven the heated tire upon the wheel in the usual way, the metal or the alloy intended to form the ring C is cast into the wheel through the openings D D D.

In old wheels the filling may be effected through the holes which were intended or used for screw-bolts.

The material for the ring may be gun-metal, white metal, or any other alloy or metal of a high or low degree of fusibility or hardness, which degree of fusibility is lower than that of the crown or tire, so that whenever the tire is to be renewed the metal may be melted out, or the tire may be cut down on the lathe and the ring turned out. As the ring is surrounded on all sides by a solid material, a loosening is quite impossible, and even when the metal fills the space in the wheel but imperfectly, or when the two hollows in tire and crown do not fit exactly, the ring will nevertheless hold with perfect safety.

This method of fastening the tires may be applied to all the existing wheels of the rolling-stock without removing the tires by turning into both sides of the wheel grooves of such form that the section of the ring filling these grooves answers to the form of a hook, clamp, or any similar form—such, for example, as indicated in Fig. II.

I am aware that tires and wheels have been made separately, and united by flowing molten metal between them until the adjacent parts have become fused, and I therefore make no claim to the same; but

I claim as my invention—

The method of fastening tires on wheels by filling corresponding grooves—turned into the crown of a wheel and the tire, and of dovetailed, hook-shaped, or other section convenient for the purpose set forth—with molten metal or alloy of a point of fusion which is lower than the point of fusion of either crown or tire, and which allows a separation of the so fastened parts by melting or cutting out the so-formed ring.

In testimony whereof I have signed my name to this specification in the presence of two subscribing witnesses.

EMIL KASELOWSKY.

Witnesses:
GUSTAV BINKENDORF,
BERTHOLD ROI.